United States Patent
Yokohashi et al.

(10) Patent No.: US 12,243,191 B2
(45) Date of Patent: Mar. 4, 2025

(54) INFORMATION PROCESSING APPARATUS AND NON-TRANSITORY COMPUTER READABLE MEDIUM TO CORRECT IMAGE HAVING MULTIPLE OBJECTS WITH PRIORITIZATION

(71) Applicant: FUJIFILM Business Innovation Corp., Tokyo (JP)

(72) Inventors: Mami Yokohashi, Kanagawa (JP); Toshihiro Iwafuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 208 days.

(21) Appl. No.: 17/404,996

(22) Filed: Aug. 17, 2021

(65) Prior Publication Data

US 2022/0358622 A1 Nov. 10, 2022

(30) Foreign Application Priority Data

May 7, 2021 (JP) ................... 2021-078992

(51) Int. Cl.
- *G06K 9/00* (2022.01)
- *G06T 5/00* (2006.01)
- *G06T 7/00* (2017.01)

(52) U.S. Cl.
CPC .............. *G06T 5/00* (2013.01); *G06T 7/0002* (2013.01); *G06T 2207/30168* (2013.01)

(58) Field of Classification Search
CPC ........................ G06T 5/001; G06T 2207/10024
See application file for complete search history.

(56) References Cited

U.S. PATENT DOCUMENTS

| | | | |
|---|---|---|---|
| 8,036,430 B2 | 10/2011 | Tokuse | |
| 8,107,757 B2 | 1/2012 | Takemoto | |
| 8,208,690 B2 | 6/2012 | Tokuse | |
| 2003/0179298 A1* | 9/2003 | Akiyama | H04N 1/6086 348/222.1 |
| 2007/0280538 A1* | 12/2007 | Okamoto | G06V 20/10 382/254 |
| 2008/0025562 A1* | 1/2008 | Takemoto | G06T 5/92 382/100 |
| 2012/0170855 A1* | 7/2012 | Maeda | G06F 16/583 382/218 |

(Continued)

FOREIGN PATENT DOCUMENTS

| | | |
|---|---|---|
| EP | 1802095 | 6/2007 |
| EP | 3531370 | 8/2019 |

(Continued)

OTHER PUBLICATIONS

"Search Report of Europe Counterpart Application", issued on Oct. 21, 2021, p. 1-p. 11.

(Continued)

*Primary Examiner* — Gregory A Morse
*Assistant Examiner* — Owais Iqbal Memon
(74) *Attorney, Agent, or Firm* — JCIPRNET

(57) ABSTRACT

An information processing apparatus includes a processor configured to: obtain plural images each including any of plural objects; and determine, based on an analysis result regarding the plural objects in the plural images, according to which of two or more objects, among the plural objects, included in an image the image is corrected.

7 Claims, 12 Drawing Sheets

(56) References Cited

U.S. PATENT DOCUMENTS

2020/0202488 A1* 6/2020 Kawaguchi ............... G06T 5/92

FOREIGN PATENT DOCUMENTS

| | | | |
|---|---|---|---|
| EP | 3531370 A2 * | 8/2019 | ........... G06K 9/6256 |
| JP | 2008035010 | 2/2008 | |
| JP | 2008054164 | 3/2008 | |
| JP | 2008205650 | 9/2008 | |
| JP | 2009223764 X | 10/2009 | |
| JP | 2013165321 | 8/2013 | |
| JP | 6606374 B2 * | 11/2019 | |

OTHER PUBLICATIONS

"Office Action of Japan Counterpart Application", issued on Dec. 24, 2024, with English translation thereof, pp. 1-9.

\* cited by examiner

| SCENE NAME | NUMBER OF IMAGES |
|---|---|
| LANDSCAPES | 20 |
| PEOPLE | 30 |
| ANIMALS | 5 |
| DISHES | 4 |
| FLOWERS | 3 |
| INDUSTRIAL PRODUCTS | 0 |

| SCENE NAME | BRIGHTNESS CORRECTION INFORMATION | CONTRAST CORRECTION INFORMATION | NOISE CORRECTION INFORMATION | SHARPNESS CORRECTION INFORMATION | SATURATION CORRECTION INFORMATION | SKIN COLOR CORRECTION INFORMATION |
|---|---|---|---|---|---|---|
| LANDSCAPES | APPLY | APPLY | | | | |
| PEOPLE | APPLY | APPLY | APPLY | | | APPLY |
| ANIMALS | APPLY | APPLY | | WEAKLY APPLY | | |
| DISHES | APPLY | APPLY | | WEAKLY APPLY | APPLY | |
| FLOWERS | APPLY | APPLY | | | APPLY | |
| INDUSTRIAL PRODUCTS | APPLY | APPLY | | STRONGLY APPLY | | |

INFORMATION PROCESSING APPARATUS AND NON-TRANSITORY COMPUTER READABLE MEDIUM TO CORRECT IMAGE HAVING MULTIPLE OBJECTS WITH PRIORITIZATION

CROSS-REFERENCE TO RELATED APPLICATIONS

This application is based on and claims priority under 35 USC 119 from Japanese Patent Application No. 2021-078992 filed May 7, 2021.

BACKGROUND

(i) Technical Field

The present disclosure relates to an information processing apparatus and a non-transitory computer readable medium.

(ii) Related Art

Japanese Unexamined Patent Application Publication No. 2008-35010 describes a data correction apparatus including the following: an image recognition unit that recognizes images in a page represented by page description data; a natural image determination unit that determines whether each of the images recognized by the image recognition unit is a natural image; an image analysis unit that calculates a set-up condition for image correction processing of a natural image; a second correction condition calculating unit that calculates a correction condition for setting similar natural images that are similar to each other to have a substantially constant image quality; and an image correction unit that applies image correction processing based on the set-up condition and the correction condition to the similar natural images.

Japanese Unexamined Patent Application Publication No. 2008-54164 describes an image processing apparatus that performs the following: on receipt of image data, analyzing the image data to identify an image-capturing target, and classifying the image-capturing target into one of a plurality of categories; and upon correction of the image data, determining correction content based on the category of the image data and the category of previously-printed image data, and performing correction processing.

A user wants to correct an image to achieve a sense of unity in image quality with a plurality of images, but that image may happen to include two or more objects. In such a case, if the user adopts a configuration that corrects the image according to both or all of the two or more objects, the image may not be corrected to achieve a sense of unity in image quality with the plurality of images.

SUMMARY

Aspects of non-limiting embodiments of the present disclosure relate to enabling correction of an image including two or more objects in order to achieve a sense of unity in image quality with a plurality of images.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: obtain a plurality of images each including any of a plurality of objects; and to determine, based on an analysis result regarding the plurality of objects in the plurality of images, according to which of two or more objects, among the plurality of objects, included in an image the image is corrected.

BRIEF DESCRIPTION OF THE DRAWINGS

An exemplary embodiment of the present disclosure will be described in detail based on the following figures, wherein:

FIG. 7 is a diagram illustrating an example of correction content information to which a correction content determination unit refers when determining correction content;

DETAILED DESCRIPTION

Figure 1:
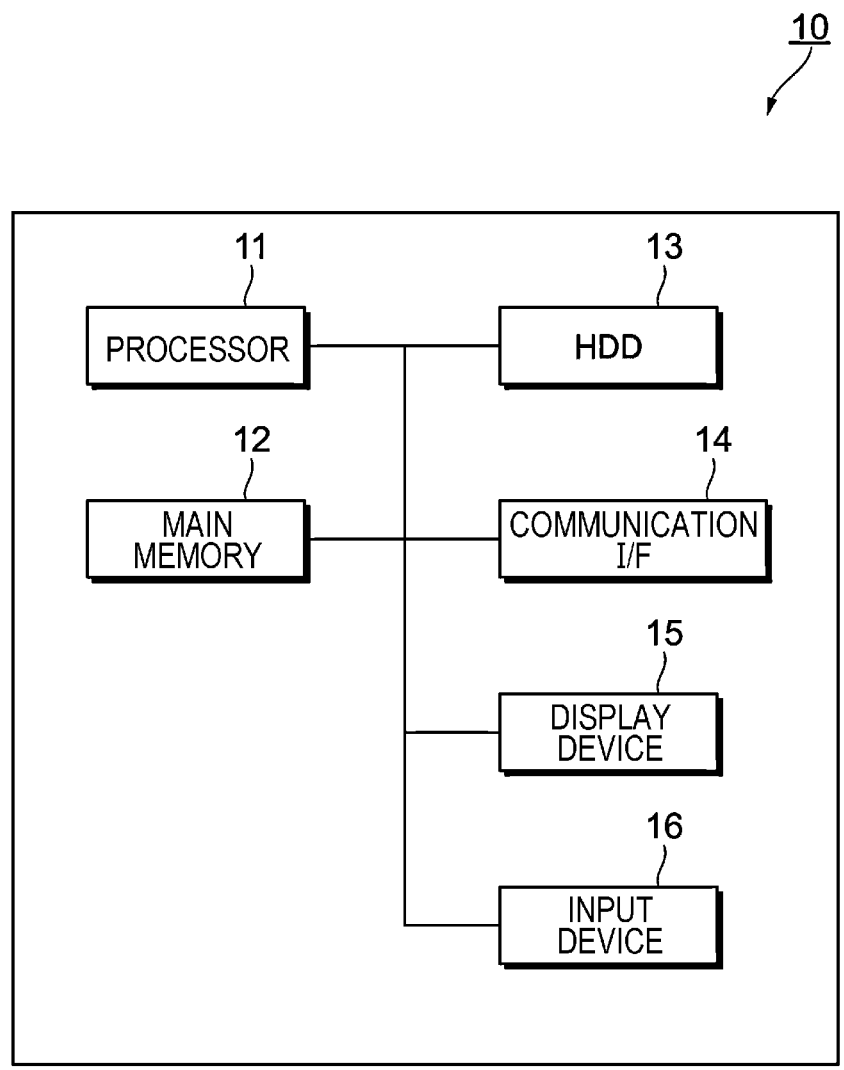
FIG. 1 is a diagram illustrating an example of the hardware configuration of an image processing apparatus in an exemplary embodiment of the present disclosure.

Hereinafter, an exemplary embodiment of the present disclosure will be described in detail with reference to the accompanying drawings.

Overview of Exemplary Embodiment

The present exemplary embodiment provides an information processing apparatus that obtains a plurality of images each including any of a plurality of objects, and that determines, based on an analysis result regarding the plurality of objects in the plurality of images, according to which of two or more objects, among the plurality of objects, included in an image the image is corrected.

Here, although the information processing apparatus may be one that obtains a plurality of images from data in any unit, such as the original or pages of printed matter that includes a plurality of images, the following description assumes that the information processing apparatus is one that obtains a plurality of images from an original of printed matter that includes a plurality of images.

In that case, it is considered that an image that is a target for determining according to which of the two or more objects the image is corrected may be included or not included in the plurality of images obtained from the original. The former is the case where images in the original are corrected to achieve a sense of unity in the original, and the latter is the case where images outside the original are corrected according to the sense of unity in the original. Although the information processing apparatus may perform either of the two types of correction, the following description assumes that the information processing apparatus performs the former type of correction.

In addition, although the analysis result may be any information regarding the plurality of objects in the plurality of images, the following description assumes that the analysis result is information that indicates the importance of each of the plurality of objects in the plurality of images.

In that case, the analysis result may represent the importance of each object by any information regarding images including each object in the plurality of images. Examples of information regarding images include the number of images including each object among the plurality of images, the area of each object in the plurality of images, and the position of each object in each of the plurality of images. Hereinafter, the number of images including each object among the plurality of images will be described by way of example.

In addition, in the case where the analysis result indicates that the importance of a specific object among the two or more objects is greater than or equal to a criterion, the information processing apparatus may determine to correct the image according to the specific object. Here, examples of the importance of a specific object among the two or more objects being greater than or equal to a criterion include the importance of a specific object among the two or more objects being the highest, and the importance of a specific object being greater than or equal to a predetermined threshold. Hereinafter, the former will be described by way of example.

In the case where the specific object includes a first object and a second object, the information processing apparatus may determine, based on an analysis result regarding the first object and the second object in some of the plurality of images, according to which of the first object and the second object the image is corrected. Here, as long as "some" are some of the plurality of images, it does not matter how large or small the proportion of "some" is in the plurality of images. Hereinafter, the case where the plurality of images are all the images included in the original, and some are all the images included in one or more pages of the original will be described by way of example.

The information processing apparatus performs the above operation as a first operation. In this case, it may be regarded that, in the case where the information processing apparatus obtains an image including a first object and a second object in a state where the image is included in a first original, the information processing apparatus corrects the image according to the first object; and, in the case where the information processing apparatus obtains the image in a state where the image is included in a second original, the information processing apparatus corrects the image according to the second object.

In addition, if the two or more objects include an object specified by a user, the information processing apparatus may determine to correct the image according to the specified object. In that case, if the two or more objects do not include an object specified by a user, the information processing apparatus may determine, based on the analysis result, according to which of the two or more objects the image is corrected.

The information processing apparatus performs an operation obtained by adding this operation to the first operation as a second operation.

Hereinafter, the information processing apparatus will be described as an image processing apparatus by way of example. Here, the image processing apparatus may be a personal computer (PC) where image processing software is installed, and may be connected to a printer that prints an image-processed image.

Hardware Configuration of Image Processing Apparatus

FIG. 1 is a diagram illustrating an example of the hardware configuration of an image processing apparatus 10 in the present exemplary embodiment. As illustrated in FIG. 1, the image processing apparatus 10 includes a processor 11, a main memory 12, and a hard disk drive (HDD) 13. Here, the processor 11 realizes functions described later by executing various types of software such as the operating system (OS) and applications. In addition, the main memory 12 is a storage area for storing various types of software and data used in executing the software, and the HDD 13 is a storage area for storing input data for various types of software and output data from various types of software. Furthermore, the image processing apparatus 10 includes a communication interface (I/F) 14, which is for communicating with the outside, a display device 15, such as a display, and an input device 16, such as a keyboard and a mouse.

Functional Configuration of Image Processing Apparatus

Figure 2:
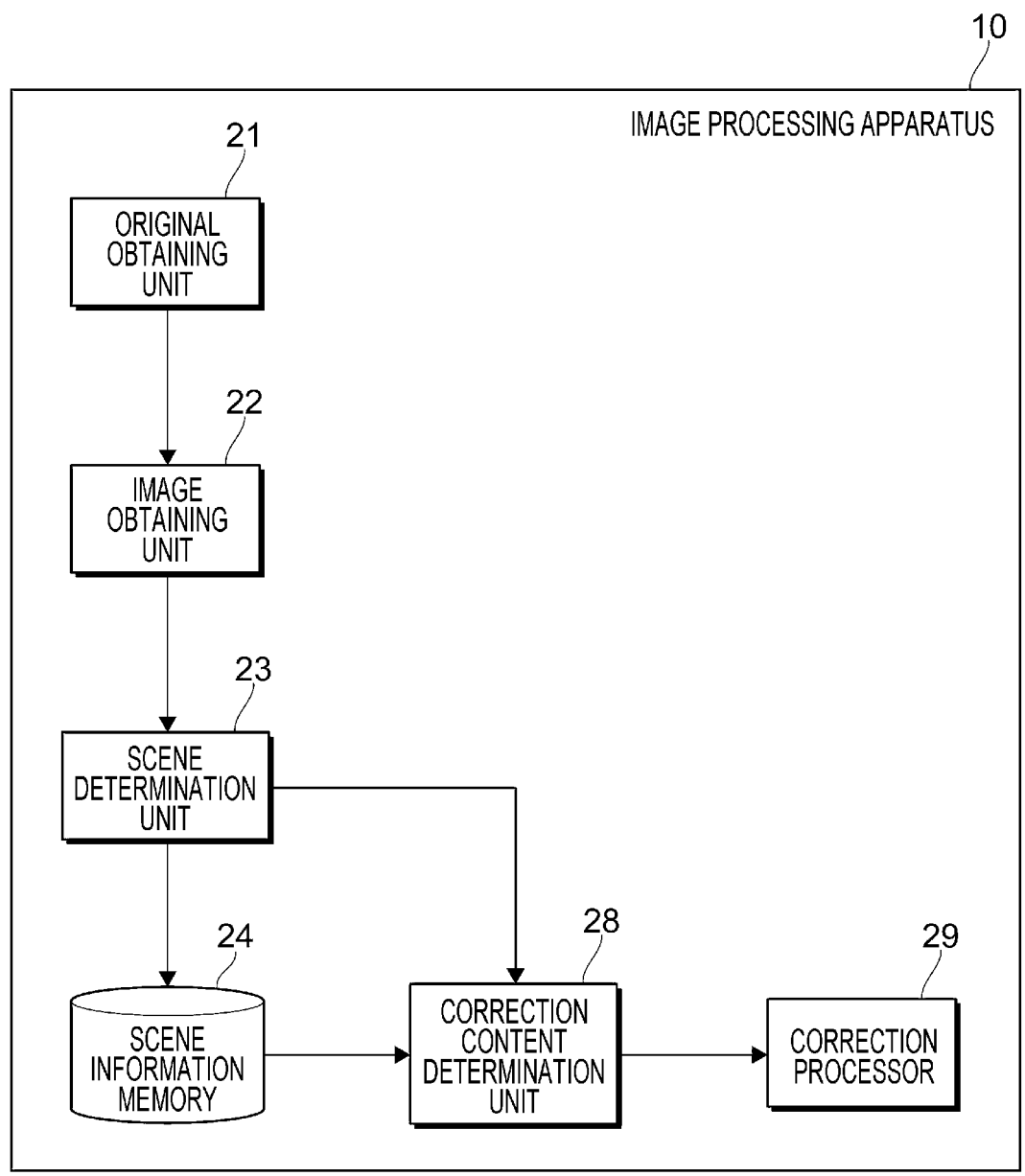
FIG. 2 is a block diagram illustrating an example of the functional configuration of the image processing apparatus in the exemplary embodiment of the present disclosure.

FIG. 2 is a block diagram illustrating an example of the functional configuration of the image processing apparatus 10 in the present exemplary embodiment. As illustrated in FIG. 2, the image processing apparatus 10 includes an original obtaining unit 21, an image obtaining unit 22, a scene determination unit 23, a scene information memory 24, a correction content determination unit 28, and a correction processor 29.

The original obtaining unit 21 obtains an original of printed matter that includes a plurality of images in the case of performing the first operation. Here, the printed matter is one that is printed by a printer on a recording medium such as paper and that is used for a specific application. Examples of the printed matter include photobooks and food commodities. The original is data output to a printer for generating the printed matter. Examples of the original include data, generated by software, of photobooks and food commodities.

In the case of performing the second operation, the original obtaining unit 21 obtains, in addition to the above, an original mode that indicates a top priority scene that is a scene that the user wants to give top priority in the original. As will be described later, in the first operation, correction is performed according to a scene that is included in many images. In the second operation, although a certain scene may be included in only a few images, the user may sometimes want to perform correction according to that scene with top priority. Therefore, a top priority scene may be specified from the outside, regardless of the number of images.

The image obtaining unit 22 obtains a plurality of images from the original obtained by the original obtaining unit 21. Here, it is preferable that the plurality of images be all the images included in the original; however, if all the images are too numerous, some of the images included in the original may be obtained. In addition, each of the plurality of images includes any of a plurality of scenes prepared in advance. Here, the scenes are objects included in images. For example, if an image is a photograph, a scene is a subject, i.e., an image-capturing target, included in the image. The scenes include, for example, landscapes, people, animals, and dishes. As the scenes, it is preferable that scenes that may be discriminated by image discrimination technology based on artificial intelligence (AI) be prepared in advance. In the present exemplary embodiment, processing of the image obtaining unit 22 is performed as an example of obtaining a plurality of images each including any of a plurality of objects.

The scene determination unit 23 determines one or more scenes included in each of the plurality of images obtained by the image obtaining unit 22, thereby generating scene information regarding scenes in the original. The scene determination unit 23 may determine one or more scenes using, for example, image discrimination technology based on AI. For each scene, the scene determination unit 23 counts the number of images including that scene, and, for each scene, generates information on the number of images including that scene as scene information. Every time the scene determination unit 23 determines one or more scenes included in an image obtained by the image obtaining unit 22, the scene determination unit 23 passes that image to the correction content determination unit 28.

The scene information memory 24 stores the scene information generated by the scene determination unit 23. In the present exemplary embodiment, the scene information is used as an example of an analysis result regarding the plurality of objects in the plurality of images. In the present exemplary embodiment, the scene information is also used as an example of an analysis result indicating the importance of each of the plurality of objects in the plurality of images. In the present exemplary embodiment, the scene information is further used as an example of an analysis result indicating the importance of each object by the number of images including each object among the plurality of images.

In the case of performing the first operation, the correction content determination unit 28 determines, on the basis of the scene information stored in the scene information memory 24, according to which of two or more scenes included in an image, passed from the scene determination unit 23, the image is corrected. In the present exemplary embodiment, this processing of the correction content determination unit 28 is performed as an example of determining, based on the analysis result, according to which of two or more objects, among a plurality of objects, included in an image the image is corrected.

For example, the correction content determination unit 28 determines to correct an image including two or more scenes, passed from the scene determination unit 23, according to a scene that is included in the most numerous images in the original. In the present exemplary embodiment, the case where a certain scene among the two or more scenes is included in the most numerous images in the original is used as an example of the case where the analysis result indicates that the importance of a specific object among the two or more objects is greater than or equal to a criterion. In addition, in the present exemplary embodiment, this processing of the correction content determination unit 28 is performed as an example of determining, in that case, to correct the image according to the specific object.

In addition, if there are plural scenes that are included in the most numerous images in the original, the correction content determination unit 28 determines to correct an image including two or more scenes, passed from the scene determination unit 23, according to a scene included in the most numerous images in one or more pages. In the present exemplary embodiment, the case where there are plural scenes included in the most numerous images in the original is used as an example of the case where the specific object includes a first object and a second object. In addition, in the present exemplary embodiment, information on a scene included in the most numerous images in one or more pages is used as an example of an analysis result regarding the first object and the second object in some of the plurality of images. Furthermore, in the present exemplary embodiment, this processing of the correction content determination unit 28 is performed as an example of determining, in that case, based on the analysis result, according to which of the first object and the second object the image is corrected.

Furthermore, if there are plural scenes that are included in the most numerous images in one or more pages, the correction content determination unit 28 determines to correct an image including two or more scenes, passed from the scene determination unit 23, according to a scene determined by predetermined priority. Here, as the predetermined priority, the order of people, landscapes, animals, dishes, flowers, and industrial products is given as an example. This is the ascending order of the degree of impact, which is obtained by taking into consideration the degree of impact of correction.

The correction content determination unit 28 determines the correction content of correction according to the scene on the basis of the association between predetermined scenes and correction content.

In the case of performing the second operation, the correction content determination unit 28 determines, also on the basis of an original mode obtained by the original obtaining unit 21 in addition to the above, according to which of two or more scenes included in an image, passed from the scene determination unit 23, the image is corrected. For example, the correction content determination unit 28 specifies a top priority scene on the basis of the original mode. If the top priority scene is included in two or more scenes included in an image, passed from the scene determination unit 23, the correction content determination unit 28 determines to correct the image according to the top priority scene. In the present exemplary embodiment, the top priority scene is used as an example of an object specified by a user. In addition, in the present exemplary embodiment, this processing of the correction content determination unit 28 is performed as an example of determining, if the two or more objects include an object specified by a user, to correct the image according to the specified object.

If the top priority scene is not included in two or more scenes included in an image, passed from the scene determination unit 23, the correction content determination unit 28 performs the same correction as the first operation. In the present exemplary embodiment, this processing of the correction content determination unit 28 is performed as an example of determining, if the two or more objects do not include an object specified by a user, based on the analysis result, according to which of the two or more objects the image is corrected.

When the image and the correction content are passed from the correction content determination unit 28, the correction processor 29 performs correction processing of the passed image with the passed correction content. In the present exemplary embodiment, the processing of the correction processor 29 is performed as an example of correcting an image including a first object and a second object according to the first object in the case where the image is obtained in a state where the image is included in a first original, and correcting the image according to the second object in the case where the image is obtained in a state where the image is included in a second original.

Note that it is not always necessary for the image processing apparatus 10 to include all of the original obtaining unit 21, the image obtaining unit 22, the scene determination unit 23, the scene information memory 24, the correction content determination unit 28, and the correction processor 29. For example, the image processing apparatus 10 need not include the original obtaining unit 21. In that case, in the image processing apparatus 10, the image obtaining unit 22 may obtain a plurality of images before these images are included in an original. Alternatively, the image processing apparatus 10 need not include the correction processor 29. In that case, the image processing apparatus 10 may convey the correction content determined by the correction content determination unit 28 to another apparatus, and this other apparatus may correct a to-be-corrected image with the conveyed correction content.

First Operation of Image Processing Apparatus

Figure 3A:
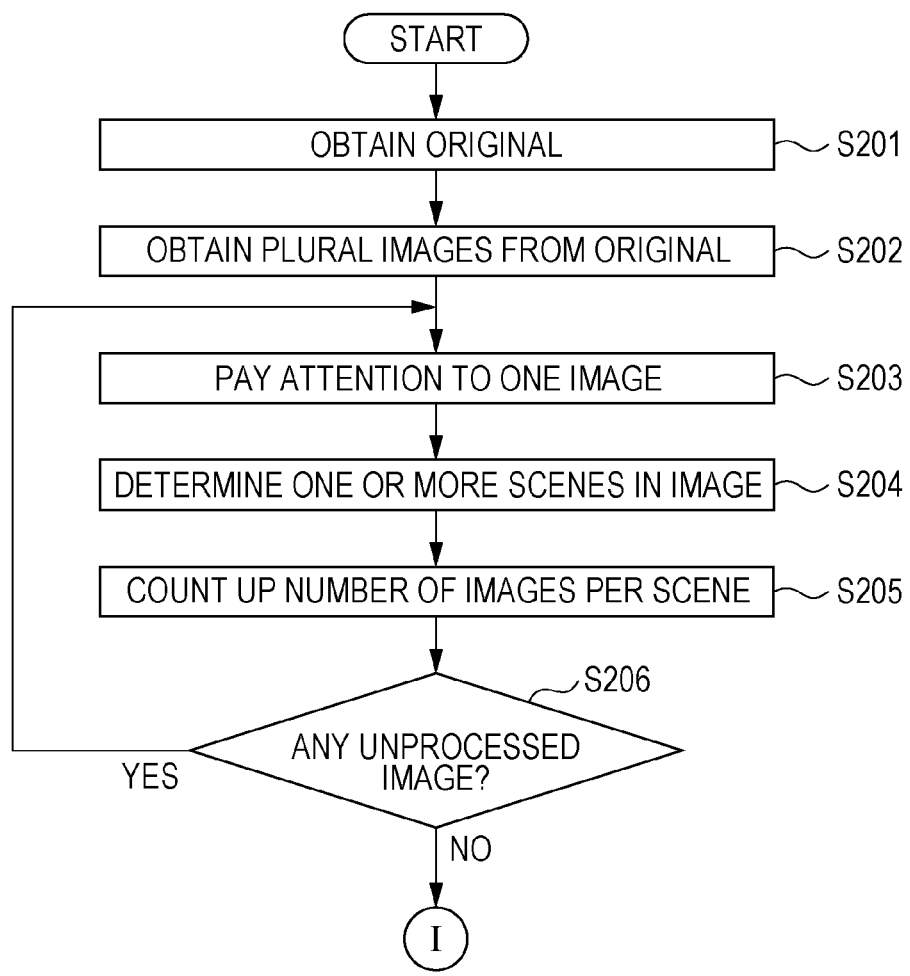
FIG. 3A is a flowchart illustrating an example of a first operation of the image processing apparatus in the exemplary embodiment of the present disclosure.
Figure 3B:
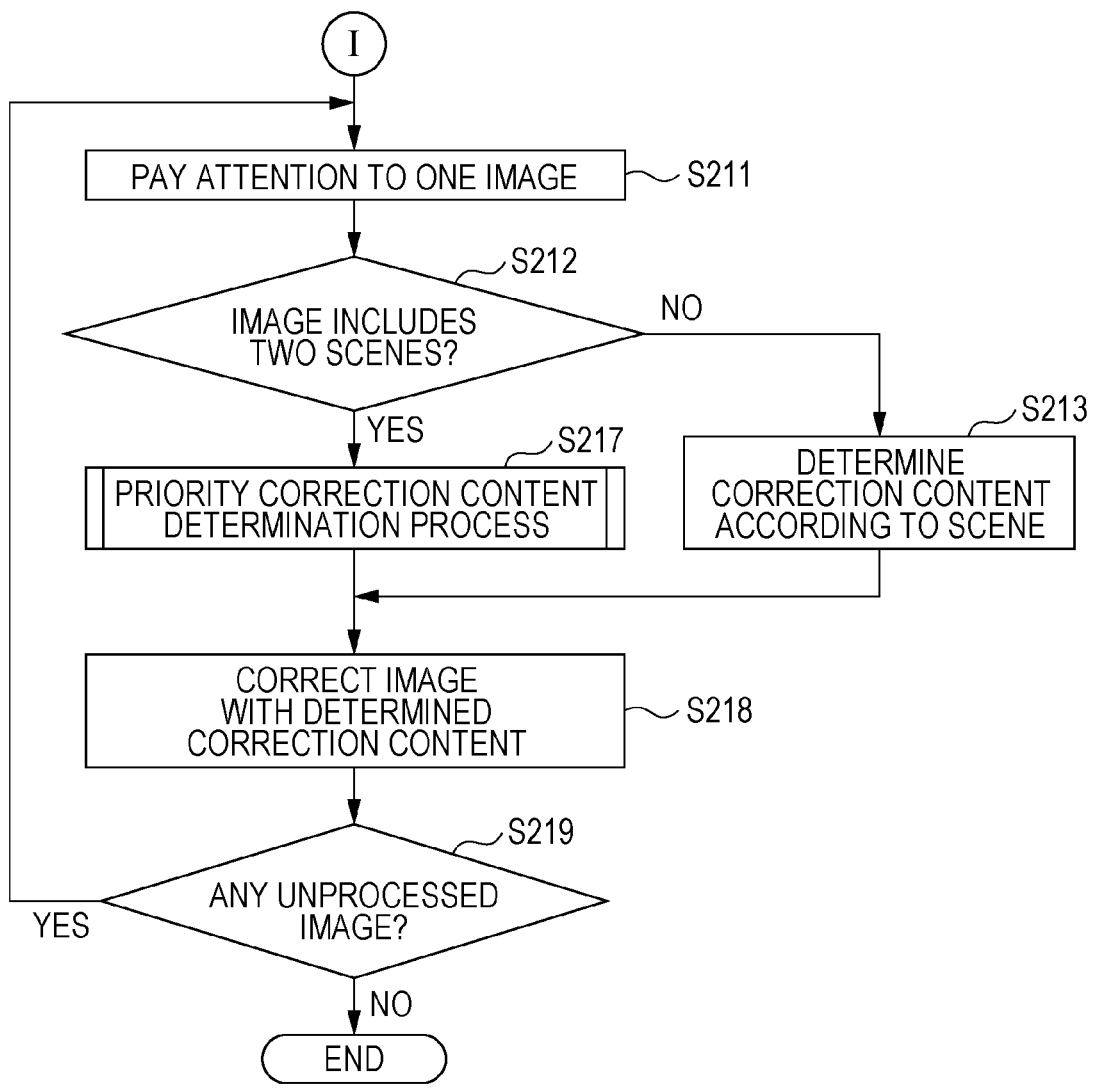
FIG. 3B is a flowchart illustrating an example of the first operation of the image processing apparatus in the exemplary embodiment of the present disclosure.

FIGS. 3A and 3B are flowcharts illustrating an example of the first operation of the image processing apparatus 10 in the present exemplary embodiment. Note that it is assumed below that one image includes two scenes at most for the sake of simplicity of the description.

As illustrated in FIG. 3A, in the image processing apparatus 10, the original obtaining unit 21 first obtains an original (step S201).

Next, the image obtaining unit 22 obtains a plurality of images from the original obtained in step S201 (step S202).

Next, the scene determination unit 23 pays attention to one of the plurality of images obtained in step S202 (step S203). The scene determination unit 23 determines one or more scenes in the image to which attention has been paid in step S203 (step S204). Accordingly, the scene determination unit 23 counts up the number of images per scene on the basis of scene information stored in the scene information memory 24 (step S205). After that, the scene determination unit 23 determines whether there is any unprocessed image in the images obtained in step S202 (step S206). If it is determined that there is an unprocessed image, the scene determination unit 23 returns the process back to step S203; if it is determined that there is no unprocessed image, the scene determination unit 23 advances the process to FIG. 3B.

Next, as illustrated in FIG. 3B, the correction content determination unit 28 pays attention to one of the plurality of images used in scene determination in step S204 (step S211). The correction content determination unit 28 determines whether the image to which attention has been paid in step S211 includes two scenes (step S212). If it is determined in step S212 that the image does not include two scenes, the correction content determination unit 28 determines correction content according to one scene included in the image (step S213).

If it is determined in step S212 that the image includes two scenes, the correction content determination unit 28 performs a priority correction content determination process of determining the correction content of a scene to be prioritized out of the two scenes (step S217). This priority correction content determination process will be described in detail later.

Next, the correction processor 29 corrects the image to which attention has been paid in step S211 with the correction content determined in step S213 or step S217 (step S218). After that, the correction processor 29 determines whether there is any unprocessed image in the images used in scene determination in step S204 (step S219). If it is determined that there is an unprocessed image, the correction processor 29 returns the process back to step S211; if it is determined that there is no unprocessed image, the correction processor 29 ends the process.

Figure 4:
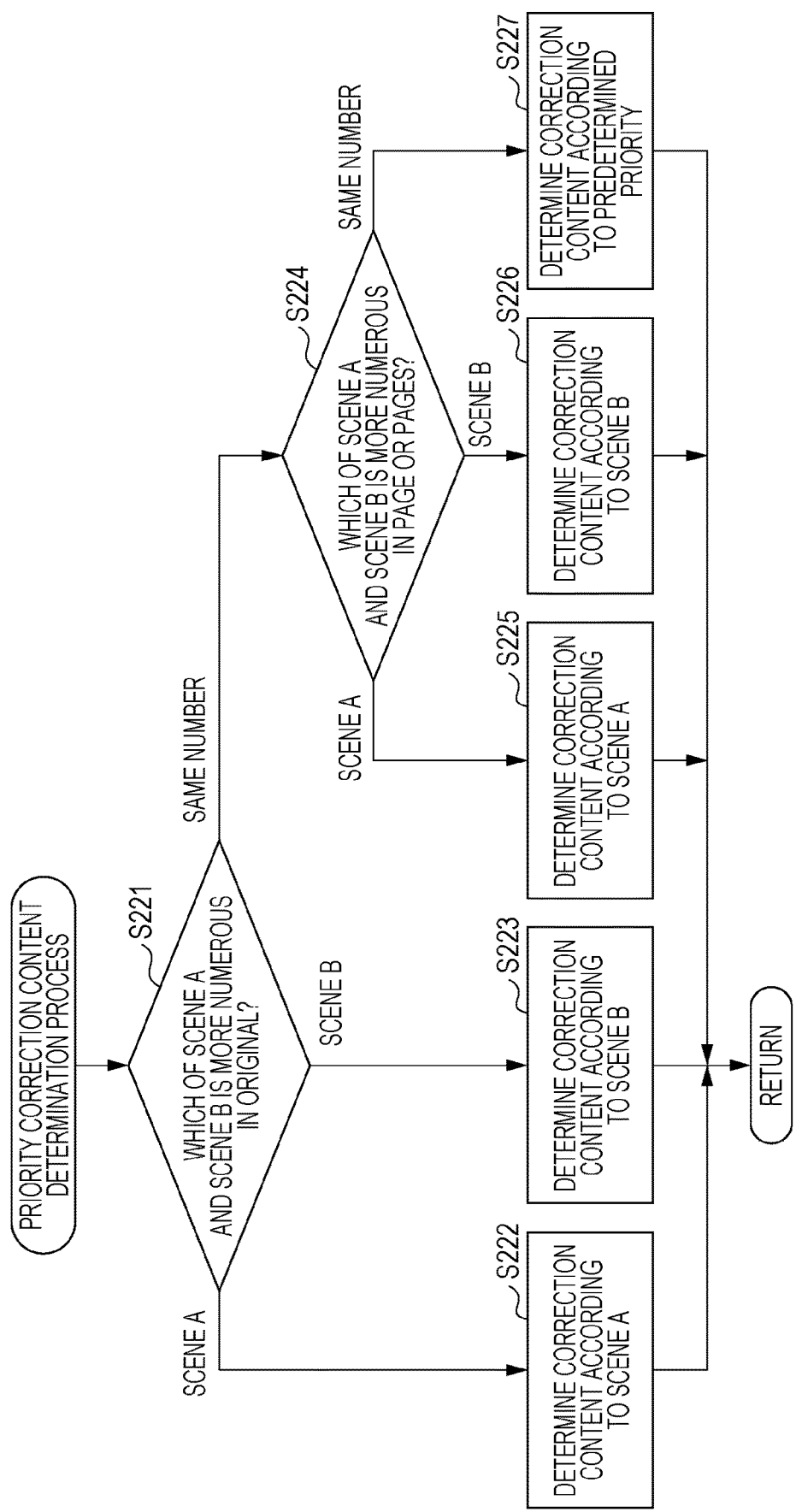
FIG. 4 is a flowchart illustrating an example of the flow of a priority correction content determination process in the exemplary embodiment of the present disclosure.

In addition, FIG. 4 is a flowchart illustrating an example of the flow of the priority correction content determination process in step S217 in FIG. 3B.

At first, the correction content determination unit 28 refers to scene information stored in the scene information memory 24, thereby determining which of images of scene A and images of scene B are more numerous in the original (step S221). If it is determined in step S221 that images of scene A are more numerous in the original, the correction content determination unit 28 determines correction content according to scene A (step S222). If it is determined in step S221 that images of scene B are more numerous in the original, the correction content determination unit 28 determines correction content according to scene B (step S223).

In contrast, if it is determined in step S221 that images of A and images of scene B are the same number of images in the original, the correction content determination unit 28 determines which of images of A and images of scene B are more numerous in one or more pages (step S224). If it is determined in step S224 that images of scene A are more numerous in the page or pages, the correction content determination unit 28 determines correction content according to scene A (step S225). If it is determined in step S224 that images of scene B are more numerous in the page or pages, the correction content determination unit 28 determines correction content according to scene B (step S226). In contrast, if it is determined in step S224 that images of A and images of scene B are the same number of images in the page or pages, the correction content determination unit 28 determines correction content according to a scene determined by predetermined priority (step S227).

Specific Example of First Operation of Image Processing Apparatus

Figure 5A:
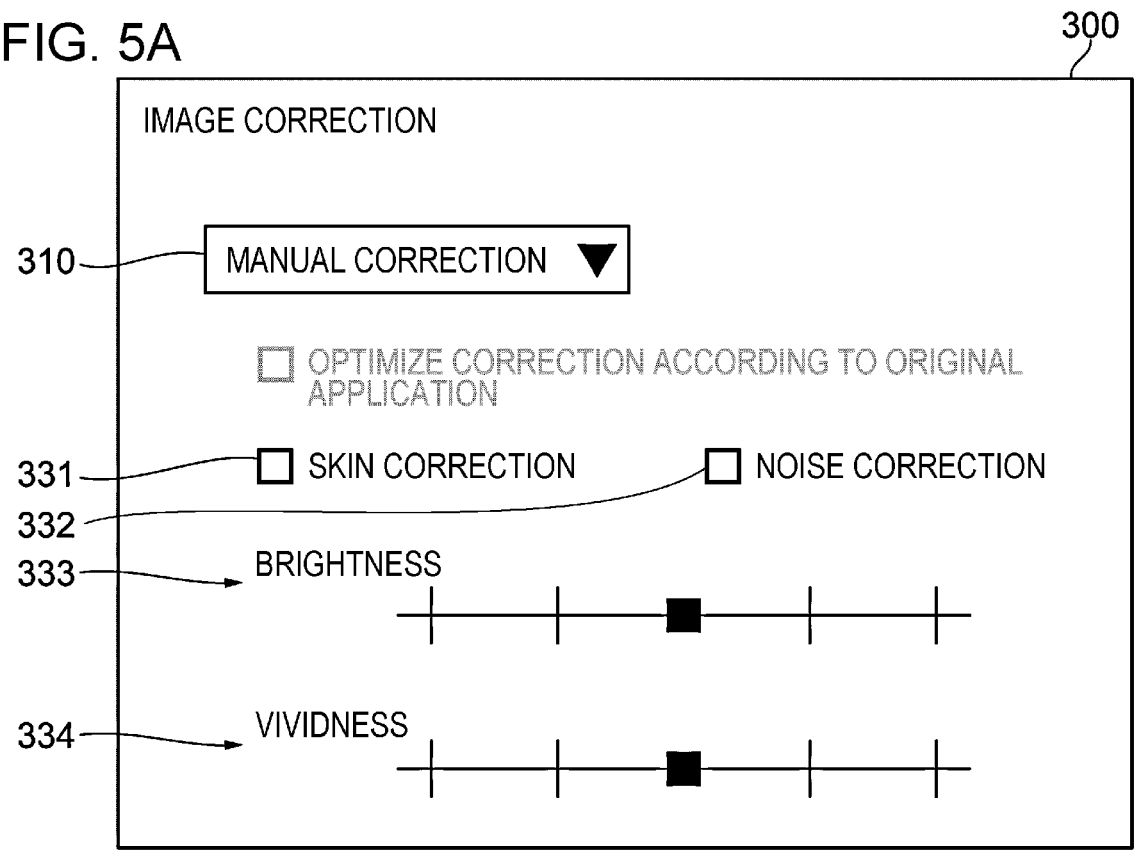
FIGS. 5A and 5B are diagrams illustrating an example of a correction setting screen displayed before an original obtaining unit obtains an original.
Figure 5B:
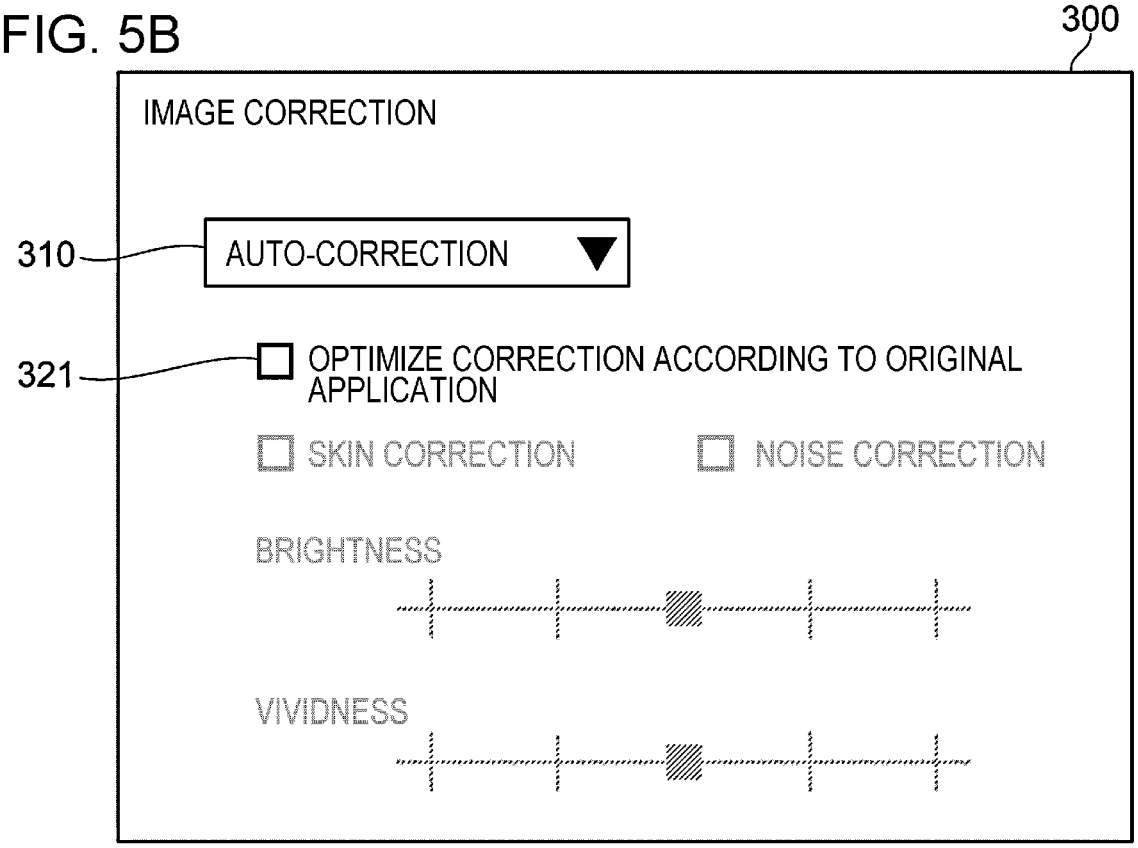

FIGS. 5A and 5B are diagrams illustrating an example of a correction setting screen 300 displayed on the display device 15 before the original obtaining unit 21 obtains an original in step S201 in FIG. 3A. As illustrated in FIGS. 5A and 5B, the correction setting screen 300 includes a pull-down list 310. With the pull-down list 310, which of auto-correction and manual correction is used to correct an image is selected.

FIG. 5A illustrates the state of the correction setting screen 300 in the case where manual correction has been selected with the pull-down list 310. In this case, check boxes 331 and 332 and slider bars 333 and 334 are displayed active, and other items are displayed inactive. With the check boxes 331 and 332, commands for performing skin correction and noise correction are respectively given. With the slider bars 333 and 334, the degree of brightness and the degree of vividness are respectively specified.

FIG. 5B illustrates the state of the correction setting screen 300 in the case where auto-correction has been selected with the pull-down list 310. In this case, the check box 321 is displayed active, and other items are displayed inactive. With the check box 321, a command for optimizing the correction according to the original application is given. When such a command is given with the check box 321, the operation of the present exemplary embodiment is performed.

Figure 6:
FIG. 6 is a diagram illustrating an example of scene information after a scene determination unit counts up the number of images per scene in a plurality of images.

FIG. 6 is a diagram illustrating an example of scene information 600 after the scene determination unit 23 counts up the number of images per scene in the plurality of images in step S205 in FIG. 3A. As illustrated in FIG. 6, the scene information 600 associates the scene name and the number of images.

The scene name is the name of a scene. The number of images is the number of images including a corresponding scene. FIG. 6 indicates that, among the images obtained in step S202 in FIG. 3A, there are twenty images that include landscapes, thirty images that include people, five images that include animals, four images that include dishes, three images that include flowers, and zero images that include industrial products. Note that, if one image includes a plurality of scenes, the number of images may be counted for each of the scenes. For example, if a certain image includes people and dishes, the image may be counted as one image including people and also as one image including dishes.

FIG. 7 is a diagram illustrating an example of correction content information 700 to which the correction content determination unit 28 refers when determining correction content in step S213 in FIG. 3B or in step S222, S223, S225, S226, or S227 in FIG. 4.

As illustrated in FIG. 7, the correction content information 700 associates the scene name, brightness correction information, contrast correction information, noise correction information, sharpness correction information, saturation correction information, and skin-color correction information. The scene name is the name of a scene. The brightness correction information, contrast correction information, noise correction information, saturation correction information, and skin-color correction information are items of information that define whether to perform corresponding correction in the case where an image includes a corresponding scene. In addition, the sharpness correction information is information that defines how much sharpness is corrected in the case where an image includes a corresponding scene.

For example, the case of correcting an image including people and dishes will be considered. To correct the image according to people, brightness correction, contrast correction, noise correction, and skin-color correction are performed. In contrast, to correct the image according to dishes, brightness correction, contrast correction, and saturation correction are performed, and sharpness correction is weakly performed. Note that the combination of types of correction for each scene illustrated in FIG. 7 is only exemplary.

Second Operation of Image Processing Apparatus

Figure 8A:
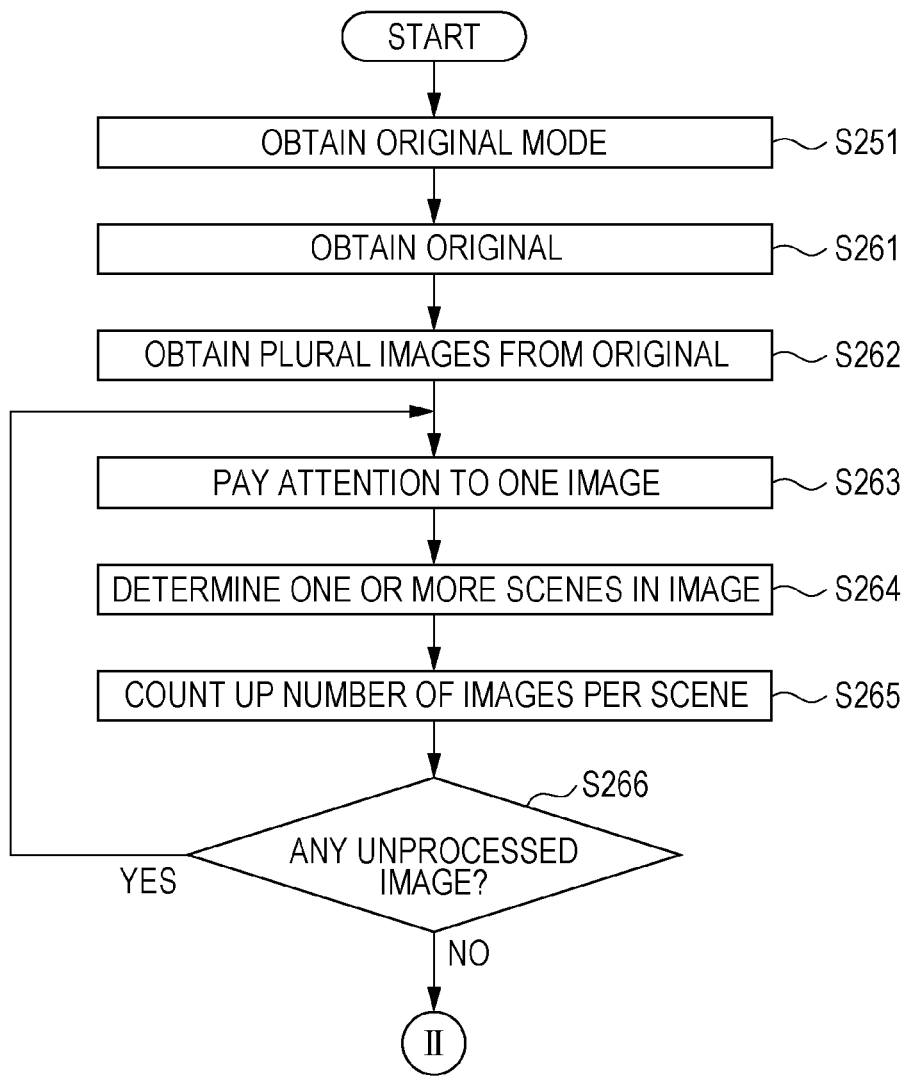
FIG. 8A is a flowchart illustrating an example of a second operation of the image processing apparatus in the exemplary embodiment of the present disclosure.
Figure 8B:
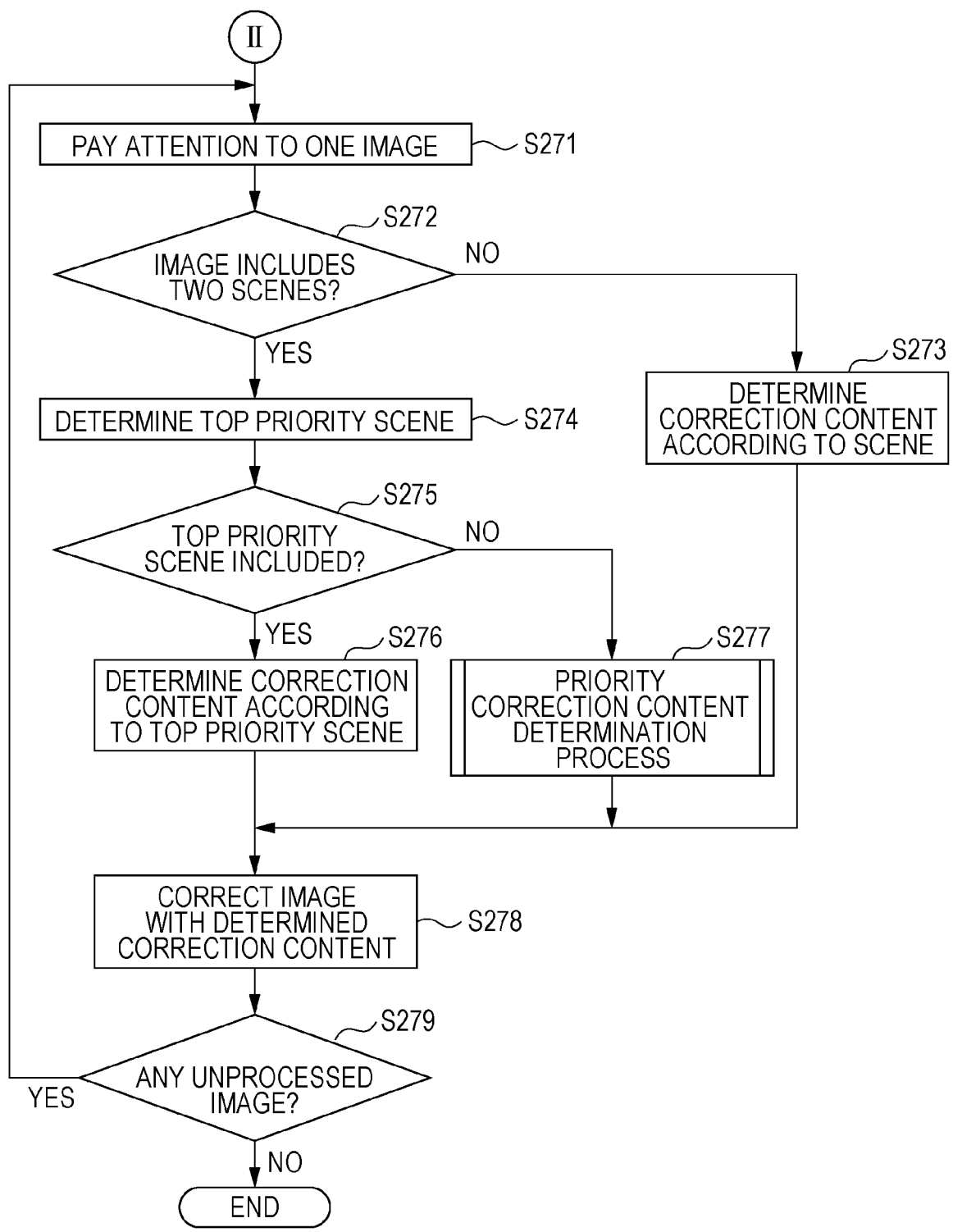
FIG. 8B is a flowchart illustrating an example of the second operation of the image processing apparatus in the exemplary embodiment of the present disclosure.

FIGS. 8A and 8B are flowcharts illustrating an example of the second operation of the image processing apparatus 10 in the present exemplary embodiment. Note that it is also assumed below that one image includes two scenes at most for the sake of simplicity of the description.

As illustrated in FIG. 8A, in the image processing apparatus 10, the original obtaining unit 21 first receives an original mode (step S251). Note that the original mode is stored in memory (not illustrated) to which the correction content determination unit 28 may refer. Then, the original obtaining unit 21 obtains an original (step S261).

Next, the image obtaining unit 22 obtains a plurality of images from the original obtained in step S261 (step S262).

Next, the scene determination unit 23 pays attention to one of the plurality of images obtained in step S262 (step S263). The scene determination unit 23 determines one or more scenes in the image to which attention has been paid in step S263 (step S264). Accordingly, the scene determination unit 23 counts up the number of images per scene on the basis of scene information stored in the scene information memory 24 (step S265). After that, the scene determination unit 23 determines whether there is any unprocessed image in the images obtained in step S262 (step S266). If it is determined that there is an unprocessed image, the scene determination unit 23 returns the process back to step S263; if it is determined that there is no unprocessed image, the scene determination unit 23 advances the process to FIG. 8B.

Next, as illustrated in FIG. 8B, the correction content determination unit 28 pays attention to one of the plurality of images used in scene determination in step S264 (step S271). The correction content determination unit 28 determines whether the image to which attention has been paid in step S271 includes two scenes (step S272). If it is determined in step S272 that the image does not include two scenes, the correction content determination unit 28 determines correction content according to one scene included in the image (step S273).

If it is determined in step S272 that the image includes two scenes, the correction content determination unit 28 determines a top priority scene on the basis of the original mode received in step S251 and stored in the memory (not illustrated) (step S274). The correction content determination unit 28 determines whether there is the top priority scene in the two scenes specified in step S272 (step S275). If it is determined in step S275 that there is the top priority scene in the two scenes, the correction content determination unit 28 determines correction content according to the top priority scene (step S276).

If it is determined in step S275 that there is no top priority scene in the two scenes, the correction content determination unit 28 performs a priority correction content determination process of determining the correction content of a scene to be prioritized out of the two scenes (step S277). Since this priority correction content determination process has been described in detail with reference to FIG. 4, a description thereof is omitted here.

Next, the correction processor 29 corrects the image to which attention has been paid in step S271 with the correction content determined in step S273, S276, or S277 (step S278). After that, the correction processor 29 determines whether there is any unprocessed image in the images used in scene determination in step S264 (step S279). If it is determined that there is an unprocessed image, the correction processor 29 returns the process back to step S271; if it is determined that there is no unprocessed image, the correction processor 29 ends the process.

Specific Example of Second Operation of Image Processing Apparatus

Figure 9:
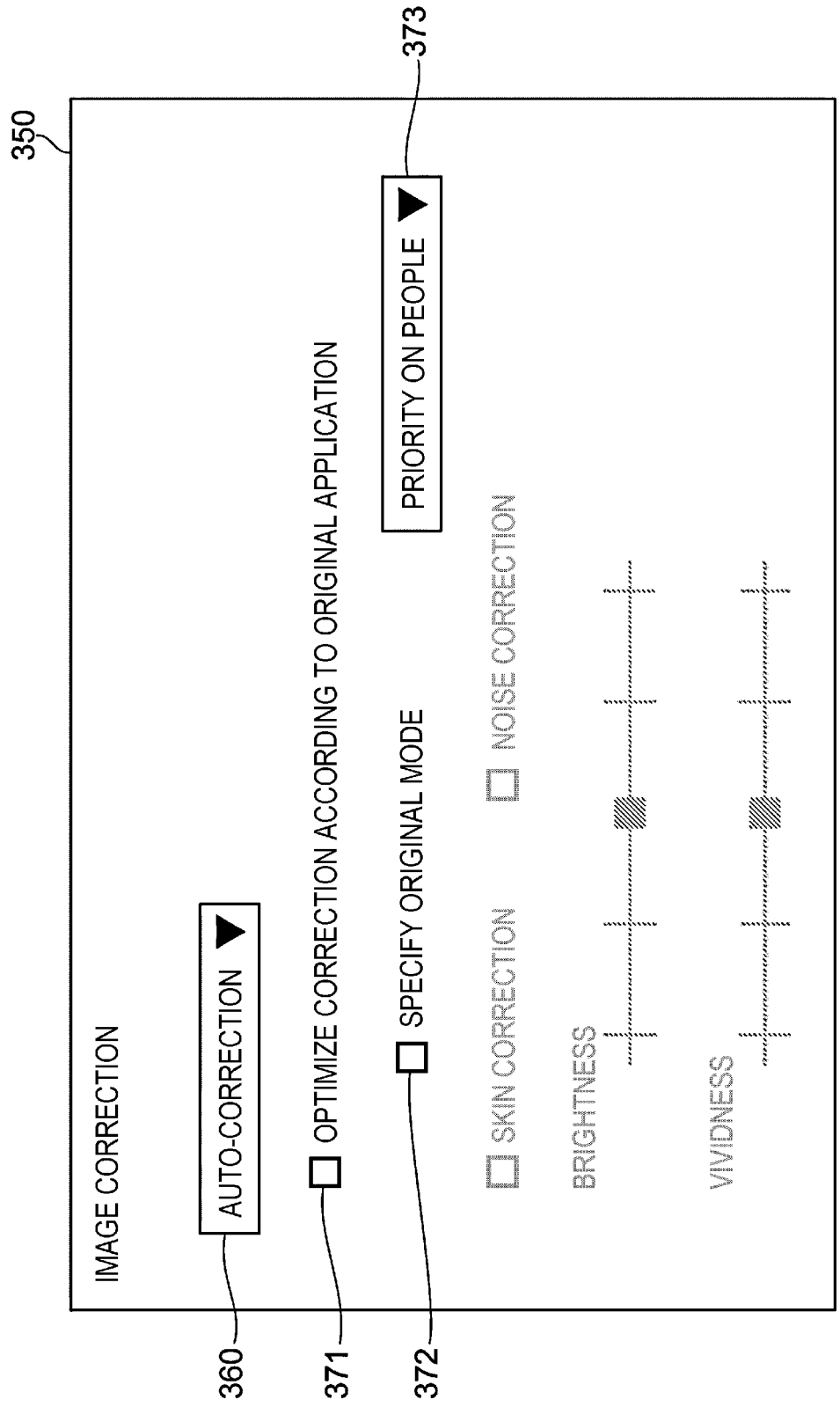
FIG. 9 is a diagram illustrating an example of a correction setting screen displayed when the original obtaining unit obtains an original mode.

FIG. 9 is a diagram illustrating an example of a correction setting screen 350 displayed on the display device 15 when the original obtaining unit 21 obtains the original mode in step S251 in FIG. 8A. As illustrated in FIG. 9, the correction setting screen 350 includes a pull-down list 360. With the pull-down list 360, which of auto-correction and manual correction is used to correct an image is selected.

FIG. 9 illustrates the state of the correction setting screen 350 in the case where auto-correction has been selected with the pull-down list 360. In this case, check boxes 371 and 372 and a pull-down list 373 are displayed active, and other items are displayed inactive. With the check box 371, a command for optimizing the correction according to the original application is given. With the check box 372, a command for specifying the original mode is given. With the pull-down list 373, any of original modes is selected. Here, a priority-on-people mode is selected. When such commands are given with the check boxes 371 and 372, the operation of the present exemplary embodiment is performed. Since the priority-on-people mode has been selected with the pull-down list 373 here, if people are included in the two scenes included in the image, in step S276 in FIG. 8B, the correction content determination unit 28 determines correction content according to people as the correction content of the image.

Scene information after the scene determination unit 23 counts up the number of images per scene in the plurality of images in step S265 in FIG. 8A is the same as that described with reference to FIG. 6.

Figure 10:
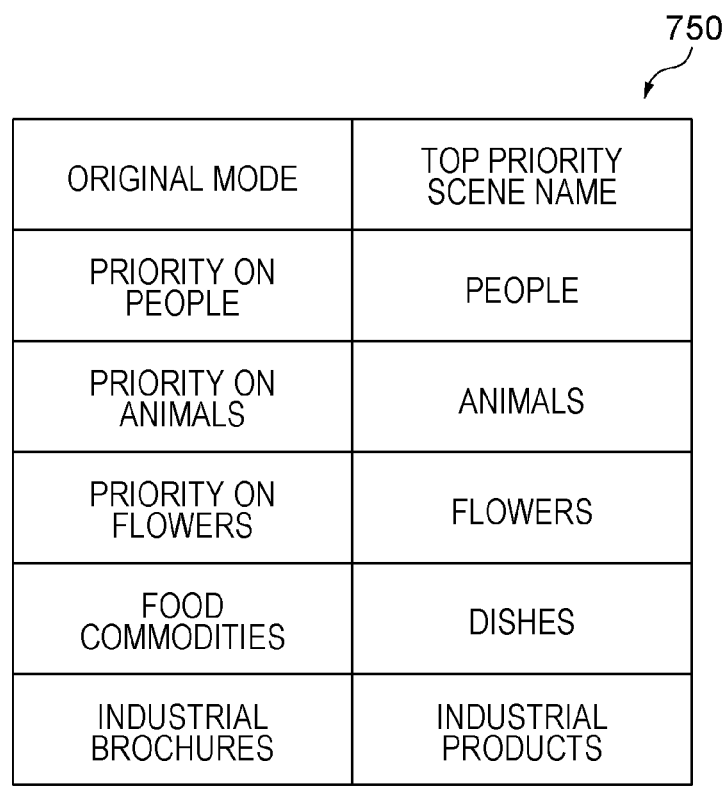
FIG. 10 is a diagram illustrating an example of top priority scene information to which the correction content determination unit refers when determining a top priority scene.

FIG. 10 is a diagram illustrating an example of top priority scene information 750 to which the correction content determination unit 28 refers when determining a top priority scene in step S274 in FIG. 8B.

As illustrated in FIG. 10, the top priority scene information 750 associates the original mode and the top priority scene name. The original mode is a mode that indicates a top priority scene that is a scene that the user wants to give top priority in the original. The top priority scene name is the name of a top priority scene indicated in a corresponding original mode.

Correction content information to which the correction content determination unit 28 refers when determining correction content in step S273 or S276 in FIG. 8B or in step S222, S223, S225, S226, or S227 in FIG. 4 is the same as that described with reference to FIG. 7.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

Processing performed by the image processing apparatus 10 in the present exemplary embodiment is prepared as a program such as application software.

That is, a program realizing the present exemplary embodiment is regarded as a program causing a computer to realize the following functions: obtaining a plurality of images each including any of a plurality of objects; and determining, based on an analysis result regarding the plurality of objects in the plurality of images, according to which of two or more objects, among the plurality of objects, included in an image the image is corrected.

Needless to say, the program realizing the present exemplary embodiment may be provided by a communication unit or by being stored in a recording medium such as compact-disc read-only memory (CD-ROM) or the like.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
obtain an original of printed matter;
obtain a plurality of images each including any of a plurality of objects, from the original of printed matter;
determine to correct an image among the plurality of images that includes two or more objects among the plurality of objects based on an analysis result regarding the plurality of objects in the plurality of images in the original of printed matter, wherein the two or more objects comprise a specific object that is presented most among the plurality of images in the original of the printed matter and corresponds to a highest priority, wherein each of the plurality of objects corresponds to a different combination of types of image correction;
determine a combination of types of image correction corresponding to the specific object,
wherein a first object among the plurality of object corresponds to a first combination of types of image correction,
wherein a second object among the plurality of object corresponds to a second combination of types of image correction,
wherein the second object is different from the first object, and
wherein the second combination of types of image correction is different from the first combination of types of image correction; and
perform image correction on the entire image by using the determined combination of types of image correction.

2. The information processing apparatus according to claim 1, wherein the analysis result indicates importance of each of the plurality of objects in the plurality of images.

3. The information processing apparatus according to claim 2, wherein the analysis result indicates the importance of each object by a number of images including each object among the plurality of images.

4. The information processing apparatus according to claim 2, wherein the processor is configured to determine, in a case where the analysis result indicates that importance of the specific object among the two or more objects is greater than or equal to a criterion, to correct the image according to the specific object.

5. A non-transitory computer readable medium storing a program causing a computer to execute a process, the process comprising:
obtaining an original of printed matter;

obtaining a plurality of images each including any of a plurality of objects, from the original of printed matter;

determining to correct an image among the plurality of images that includes two or more objects among the plurality of objects based on an analysis result regarding the plurality of objects in the plurality of images in the original of printed matter, wherein the two or more objects comprise a specific object that is presented most among the plurality of images in the original of the printed matter and corresponds to a highest priority, wherein each of the plurality of objects corresponds to a different combination of types of image correction;

determining a combination of types of image correction corresponding to the specific object,
- wherein a first object among the plurality of object corresponds to a first combination of types of image correction,
- wherein a second object among the plurality of object corresponds to a second combination of types of image correction,
- wherein the second object is different from the first object, and
- wherein the second combination of types of image correction is different from the first combination of types of image correction; and performing image correction on the entire image by using the determined combination of types of image correction.

6. The information processing apparatus according to claim 1, wherein the processor is further configured to:
- determine to correct another image among the plurality of images that includes an object specified by a user;
- determine another combination of types of image correction corresponding to the object specified by the user; and
- perform image correction on the another entire image by using the another determined combination of types of image correction.

7. The information processing apparatus according to claim 1, wherein the processor is further configured to:
- determine to correct another image among the plurality of images that includes an object specified by a user and the specific object corresponding to the highest priority;
- determine another combination of types of image correction corresponding to the object specified by the user; and
- perform image correction on the entire another image by using the another determined combination of types of image correction.

* * * * *